United States Patent
Ogawa et al.

(10) Patent No.: US 6,716,385 B2
(45) Date of Patent: Apr. 6, 2004

(54) ETHYLENE (CO) POLYMERS, AND LAMINATE AND HOLLOW MOLDING MADE BY USING THE SAME

(75) Inventors: Koichi Ogawa, Kanagawa (JP); Haruhiko Kondou, Ohita (JP); Kei Takahashi, Ohita (JP); Daizo Tabuchi, Kanagawa (JP); Satoshi Kanazawa, Kanagawa (JP)

(73) Assignee: Japan Polyolefins Co., Ltd., Tokyo (JP)

( * ) Notice: Subject to any disclaimer, the term of this patent is extended or adjusted under 35 U.S.C. 154(b) by 0 days.

(21) Appl. No.: 10/162,767

(22) Filed: Jun. 6, 2002

(65) Prior Publication Data
US 2003/0054126 A1 Mar. 20, 2003

Related U.S. Application Data

(63) Continuation-in-part of application No. 09/446,453, filed as application No. PCT/JP98/02784 on Jun. 23, 1998, now abandoned.

(30) Foreign Application Priority Data

Jun. 24, 1997 (JP) .............................. 9-166936
Jun. 24, 1997 (JP) .............................. 9-166937

(51) Int. Cl.⁷ .............................................. B29C 49/04
(52) U.S. Cl. ..................... 264/327; 264/126; 264/211; 264/521; 264/541; 264/DIG. 33
(58) Field of Search ................. 264/126, 211, 264/327, 521, 541, DIG. 33

(56) References Cited

U.S. PATENT DOCUMENTS

| | | | |
|---|---|---|---|
| 3,975,481 A | * 8/1976 | Baumgaertner | ............. 264/126 |
| 5,384,172 A | 1/1995 | Takado et al. | |
| 5,441,781 A | 8/1995 | Uchida et al. | |
| 5,443,874 A | 8/1995 | Tachi et al. | |
| 5,547,722 A | 8/1996 | Uehara et al. | |
| 5,702,786 A | * 12/1997 | Robichaud | ................. 428/35.7 |
| 5,902,655 A | 5/1999 | Matsuoka et al. | |
| 6,033,749 A | 3/2000 | Hata et al. | |

FOREIGN PATENT DOCUMENTS

| | | | |
|---|---|---|---|
| JP | 55-152735 A | 11/1980 |
| JP | 59-196346 A | 11/1984 |
| JP | 2-52654 A | 2/1990 |
| JP | 06-248124 A | 9/1994 |
| JP | 6-299009 A | 10/1994 |
| JP | 7-101433 A | 4/1995 |
| JP | 09-169087 A | 6/1997 |

OTHER PUBLICATIONS

Plastics (Purasuchikkus), vol. 41, No. 10, pp. 59–69, 1990.
Plastics (Purasuchikkus), vol. 42, No. 5, pp. 64–72, 1991.

* cited by examiner

Primary Examiner—Sandra M. Nolan
(74) Attorney, Agent, or Firm—Sughrue Mion, PLLC

(57) ABSTRACT

Ethylene (co)polymers each having specified values of (a) density, (b) molecular weight distribution (Mw/Mn), (c) relationship between die swell (DS) and shear rate ($\dot{\gamma}$) in a region of shear rate ($\dot{\gamma}$), (d) relationship between stress ($\sigma$) and maximum stress ($\sigma$ max) in a stress-strain curve in uniaxial stretching, (e) the ratio of sample diameter to initial sample diameter and the time for sample breakage during uniaxial stretching under a constant tension, blow molding process in which the thickness of a parison is adjusted by using the said ethylene (co)polymer, and the method of improving fire resistance in moldings, laminates and hollow moldings made by using the same. The ethylene (co) polymers are excellent in drawdown resistance, puncture resistance, parison control response, pinch-off properties, durability, and fire resistance, by using it, parison thickness can be controlled freely in blow molding, and large blow moldings having complicated shapes excellent in durability and fire resistance can be obtained.

4 Claims, 1 Drawing Sheet

(a)

(b)    (c)

(a)

(b)　　　　　　　(c)

ETHYLENE (CO) POLYMERS, AND LAMINATE AND HOLLOW MOLDING MADE BY USING THE SAME

This is a Continuation-in-Part of application Ser. No. 09/446,453, filed Dec. 22, 1999, now abandoned, which is the National stage under 35 U.S.C. § 371 of PCT/JP98/02784 filed Jun. 23, 1998; the above noted prior applications are all hereby incorporated by reference.

TECHNICAL FIELD

This invention relates to a novel ethylene (co)polymer, a blow molding process in which thickness of parison is adjusted by using the (co)polymer, a method of improving fire resistance of moldings and laminate and hollow molding or blow molded products made by using the same. More particularly, this invention relates to an ethylene (co) polymer which is excellent in mechanical strengths such as impact resistance, moldability, etc. and applicable to extrusion molding, injection molding, blow molding, etc., which is excellent for use in large blow molded products required of drawdown resistance, puncture resistance, parison thickness controllability (parison control response), pinch-off properties, durability, etc., in particular excellent in fire resistance required for fuel tanks, to a method for freely adjusting thickness of parison by using the (co)polymer, to a method of improving fire resistance of moldings and to hollow moldings, laminates and hollow multilayer moldings made by using the same, which exhibit superiority in durability and fire resistance.

BACKGROUND ART

Generally, detergent bottles, food containers such as beverage bottles and vegetable oil bottles, large vessels such as drum cans and industrial cans, fuel containers such as kerosene cans and gasoline tanks, spoilers, bumpers and the like are produced by a blow molding process. The blow molding process is to pinch with a mold a cylindrically extruded parison composed of a melted resin, blowing air into the parison to blow up and change the shape of it so as to conform to the shape of the cavity of the mold, and then cooling it.

The blow molding process is widely utilized since it is applicable widely to large fuel tanks having complicated shapes, drums, and further panel-like moldings as well as hollow moldings such as bottles and since molding is simple and molding costs covering molds are inexpensive.

Recently, in the field of large vessels such as drum cans and large containers, substitution by plastics is being carried forward positively taking into consideration freedom in shape, economy, safety, and adaptability to environmental problems.

It is also the case in the field of automobile industry such as fuel tanks, bumpers and spoilers. Particularly in the field of fuel tanks, substitution by plastics proceeds remarkably along with the development of fuel permeation preventing technology by a co-extrusion technology, a sealer technology, a continuous multi-ply technology, etc.

When large products are blow molded, a phenomenon that a parison droops down due to its own weight (drawdown) tends to occur. To make the drawdown small, it has been known to use a resin having sufficiently high viscosity and melt tension.

In molding hollow moldings having a complicated shape, there tends to occur a local increase in blow ratio to cause puncture or local thinning of a parison. To prevent the puncture or local thinning of a parison, it has been known to control the thickness of the parison (parison control) to make a desired portion thick or make alterations in the appliance such as alteration of the shape of a mold.

Conventionally, there has been a problem that an increase in molecular weight and an increase in viscosity in order to improve the drawdown resistance of polyethylene results in aggravation of extrusion properties (extrusion rate, parison surface conditions) and welded strength of a parison becomes worse so that the pinch-off shape is worsened. As a method for solving the problem have been known, for example, the method in which a multi-step polymerization method using a Ziegler-type catalyst (Japanese Patent Application Laid-open No. Sho 55-152735), the method in which a small amount of radical generator and crosslinking auxiliary are added to polyethylene resin (Japanese Patent Publication Hei 2-52654), the method in which two polyethylene components are blended in a certain proportion (Japanese Patent Application Laid-open No. Hei 6-299009), etc.

However, recently larger and more complicated blow moldings are being produced so that further improvement of drawdown resistance of a resin is becoming necessary in order to extrude a heavy parison to a larger length in a stable manner. Also, in order to improve the fuel permeation of a fuel tank, there is a demand for a multilayer fuel tank provided with an ethylene/vinyl acetate copolymer saponification product (hereafter, called EVOH), which has poor heat resistance, as a barrier material. In molding them, a blow molding machine of a continuous extrusion type having a smaller retention portion and suffering less thermal decomposition of EVOH is becoming to be put in use for blow molding larger fuel tanks in place of a blow molding machine of an accumulator type which has heretofore been used for larger size molding. As compared with the accumulator type, the continuous extrusion type molding machine takes a long time for extruding a parison so that drawdown of a parison tends to occur more frequently. Therefore, there is a demand for a resin having an increased drawdown resistance.

For this purpose, the improved polyethylenes obtained, for example, by the above-mentioned processes are insufficient in drawdown resistance for obtaining large hollow moldings.

Also, according as the shape of hollow moldings becomes more complicated, there come into question phenomena that parisons will puncture when they are being formed by blowing and that local thinning of a product will occur at its corner portions, etc.

To prevent these problems, a method has generally been used in which a parison controller is used in order to control the thickness of a parison. However, conventional polyethylene and resin compositions thereof grow to have insufficient parison thickness controllability (parison control response) so that improvement of parison control response is desired. Also, as the method for enabling molding of deep drawn articles having complicated shapes, there have been known, for example, the method in which a split mold is used (Plastics, Vol. 42, No. 5, p.64–71) and the method in which a blow molding machine with a mold slanting mechanism is used (Plastics, Vol. 41, No. 10, p.59–69). However, the above-mentioned methods have a problem that costs for the apparatus and mold are high.

Furthermore, in the field of fuel tanks, which require fire resistance as one of the requisite properties, there have been proposed ethylene copolymers having an α-olefin content within a specified range and inherent viscosity, zero shear viscosity and time for melt stretching breakage being prescribed to be within respective specified ranges as a preferred material (Japanese Patent Application Laid-open No. Hei 7-101433). However, they are in an insufficient state in molding processability and fire resistance to cope with weight reduction and thickness reduction.

DISCLOSURE OF THE INVENTION

An object of the present invention is to overcome the defects of conventional polyethylenes and provide an ethylene (co)polymer having excellent drawdown resistance, puncture resistance, parison control response, and pinch-off properties.

Another object of the present invention is to provide a method for freely adjusting thickness of a parison by using the above-mentioned ethylene (co)polymer or composition thereof and blow molded products which are improved against the phenomena that the parison of blow molding having a complicated shape will puncture when expansion shaped and that there will occur local thinning of corner portions of products by using the said method. Furthermore, it is to provide blow molded products which are excellent in fire resistance by use of the above-mentioned ethylene (co)polymer or its composition.

Still another object of the present invention is to provide blow molded multilayer containers having a capability of preventing permeation of various fuels and causing no local thinning.

In a first aspect, the present invention relates to an ethylene (co)polymer which satisfies the following requirements (a) to (d):

(a) a density of 0.93 to 0.98 g/cm$^3$,
(b) a molecular weight distribution (Mw/Mn) of 25 to 50,
(c) that values of slope (A) and of intercept (B) obtained from a die swell (DS) and a shear rate ($\dot{\gamma}$) measured in a region of shear rate ($\dot{\gamma}$) (6.08 to 24.8 sec$^{-1}$) at 230° C., in accordance with the equation (1) below $$DS = A \times ln(\dot{\gamma}) + B \quad (1)$$

are such that $0 \leq A \leq 0.05$ and $1.25 \leq B \leq 1.45$,
(d) that the stress ratio of a stress (σ) at a strain of 1.0 to a maximum stress (σmax) in a stress-strain curve for uniaxial stretching at 0.1 sec$^{-1}$ measured at 170° C. is such that σmax/σ≧2.1.

Preferably, the present invention relates to an ethylene (co)polymer which further satisfies the requirement (e) that a value of α as defined by the equation (2) below $$\alpha = \epsilon/t \quad (2)$$

(wherein α is ε/t when ε defined by ε=-ln(sample diameter after t seconds $I_t$/initial sample diameter $I_o$) is 0.6) when uniaxially stretched under a constant tension such that initial stress (=tension/initial cross section of sample) measured at 170° C. is 3.0×10$^4$ Pa is not greater than 0.03 and time for sample breakage is not shorter than 25 seconds.

More preferably, the present invention relates to an ethylene (co)polymer which further satisfies the requirement (f) HLMFR≦10 g/10 min and which has a C$_{3-20}$ α-olefin content of 10 mol % or less.

In a second aspect, the present invention relates to blow molded products comprising the above-mentioned ethylene (co)polymer or composition thereof, preferably a fuel tank which exhibits superiority of the above-mentioned ethylene (co)polymer or composition thereof.

In a third aspect, the present invention relates to a laminate comprising a layer comprising the above-mentioned ethylene (co)polymer or composition thereof, a barrier layer, and optionally an adhesive layer and preferably to a laminate in which the barrier layer comprises at least one member selected from polyamide resins, ethylene/vinyl acetate copolymer saponification products, polyester resins, polyvinylidene chloride resins and compositions thereof. It is desirable that for the adhesive layer, adhesive resins which comprise copolymers of unsaturated carboxylic acids or derivatives thereof with olefins or polyolefin resins modified with unsaturated carboxylic acids or derivatives thereof be used.

In a fourth aspect, the present invention relates to a blow molded multilayer container comprising a laminate which comprises a layer comprising the above-mentioned ethylene (co)polymer or compositions thereof, an adhesive layer and a barrier layer, and preferably such exhibits superiority in multilayer blow molded fuel tanks.

In a fifth aspect, the present invention relates to a blow molded multilayer container comprising a laminate which comprises at least one resin layer selected from the recycled resin composed of the above-mentioned laminate, or compositions of the ethylene (co)polymer according to the first aspect containing the recycled resin, or compositions of these with polyolefin resin, a barrier layer, and optionally an adhesive layer, and preferably such exhibits superiority in physical properties and economy in blow molded multilayer fuel tanks.

In a sixth aspect, the present invention relates to a blow molding process in which thickness of a parison is adjusted by using the above-mentioned ethylene (co)polymer satisfying requirements (a) to (d) or composition thereof, changing the die gap, under the condition that the extrusion volume is substantially constant. The thickness of the parison having a complicated shape can be controlled easily by the said process, the parison will not puncture when expansion shaped, local thinning of corner portions will be improved, and in particular this process exhibits superiority in molding of large blow molded products having a complicated shape.

In a seventh aspect, the present invention relates to a method of improving fire resistance of blow molded products comprising the above-mentioned ethylene (co)polymer satisfying requirements (a) to (e) or composition thereof, and especially this method exhibits superiority in fuel tanks.

DETAILED DESCRIPTION OF THE INVENTION

Figure 1:
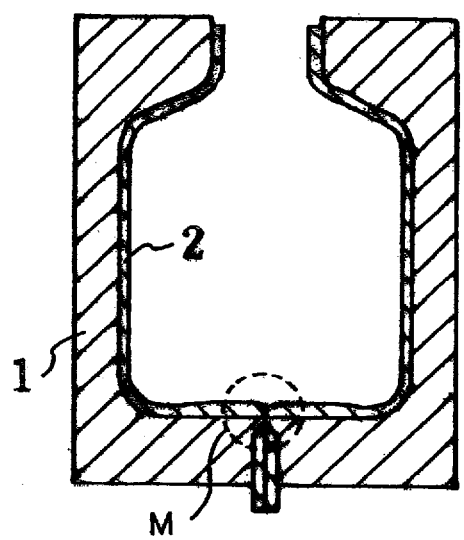
FIG. 1 is diagrams illustrating pinch-off properties when blow molding ethylene (co)polymers (2) of example and comparative example using a mold (1), with (a) being a vertically cut cross sectional view with respect to the pinch-off line of blow molding, (b) and (c) being partial enlarged views of (a) at a pinch-off middle portion (M), with (b) showing that the pinch-off shape is in a good state and (c) showing that the pinch-off shape is in a bad state.
Figure 1:
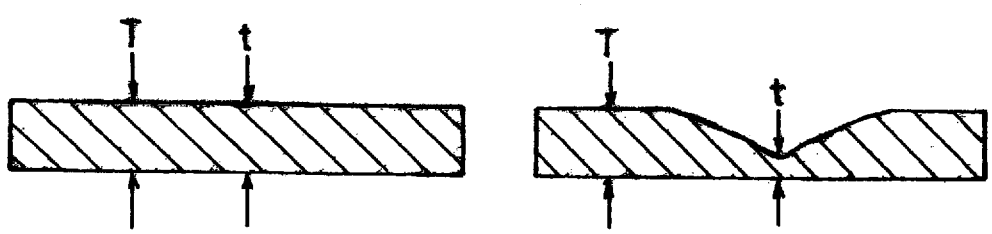

Hereafter, the present invention will be described in more detail.

The present invention has been achieved based on the finding that ethylene (co)polymer comprising an ethylene homopolymer or a copolymer of ethylene and α-olefin having 3 or more carbon atoms and having a density, a molecular weight distribution, a relationship between a die swell (DS) and a shear rate ($\dot{\gamma}$), a stress ratio, a time for melt breakage of resin which are adjusted to specified ranges is excellent in drawdown resistance, puncture resistance, parison control response, pinch-off shape properties, fire resistance, etc.

The ethylene (co)polymer of the present invention is an ethylene homopolymer or a copolymer of ethylene with an α-olefin having 3 to 20 carbon atoms. The α-olefin include, for example, propylene, 1-butene, 1-pentene, 1-hexene, 4-methylpentene-1, 1-octene, 1-decene, etc. The content of α-olefin is 10 mol % or less. If the content of α-olefin exceeds 10 mol %, there is the fear that the rigidity of (co)polymer decreases.

The ethylene (co)polymer of the present invention has (a) a density of 0.93 to 0.98 g/cm$^3$, and preferably 0.94 to 0.97 g/cm$^3$ and furthermore, desirable 0.95 g/cm$^3$ or more for fuel tanks. If the density is below 0.93 g/cm$^3$, the rigidity and fire resistance decrease. On the other hand, if the density exceeds 0.98 g/cm$^3$, the impact strength decreases.

The ethylene (co)polymer of the present invention has (b) a molecular weight distribution (Mw/Mn) which must be in the range of 25 to 50, preferably 27 to 50, and more preferably 30 to 50.

If the molecular weight distribution is below 25, drawdown resistance and extrusion properties are poor while a molecular weight distribution exceeding 50 results in an increased die swell (DS) and an increased slope (A) of the equation (1) described below, a decreased parison control response, and an increased smoke when extruding parisons.

The ethylene (co)polymer of the present invention requires (c)that values of slope (A) and of intercept (B) obtained from a die swell (DS) and a shear rate ($\dot{\gamma}$) measured in a region of shear rate ($\dot{\gamma}$) (6.08 to 24.8 sec$^{-1}$) at 230° C., in accordance with the equation (1) below $$DS = A \times ln(\dot{\gamma}) + B \quad (1)$$

(wherein ln ($\dot{\gamma}$) is a natural logarithmic value of shear rate ($\dot{\gamma}$)) are such that $0 \leq A \leq 0.05$ and $1.25 \leq B \leq 1.45$. That is, it is desirable that the ethylene (co)polymer has an appropriate range of Die Swell (DS) ((B) is within a specific range), and that the said ethylene (co)polymer has little dependency on the shear rate($\dot{\gamma}$) of Die Swell (DS) (i.e., slope value (A) in equation(1) is small). The value of slope (A) is preferably in the range of $0 \leq A \leq 0.03$, and the value of intercept (B) is preferably in the range of $1.25 \leq B \leq 1.35$.

Where the value of slope (A) is $A \leq 0.05$ and the value of intercept (B) is B>1.45 or B<1.25, or the value of slope (A) is A>0.05, control of the thickness of a parison (parison control response) becomes difficult. Further, it is difficult to produce the ethylene (co)polymer whose slope value (A) is A<0.

The ethylene (co)polymer of the present invention requires that (d) the stress ratio of a stress (σ) at a strain of 1.0 to a maximum stress (σmax) in a stress-strain curve in uniaxial stretching at 0.1 sec$^{-1}$ measured at 170° C. is in the range of σmax/$\gamma \geq 2.1$, and preferably2.5or more. The said ethylene (co)polymer exhibits superiority in puncture resistance in blow molding by satisfying this requirement. Where the stress ratio (σmax/$\gamma$) is less than 2.1, the puncture resistance decreases.

More preferably, the ethylene (co)polymer of the present invention requires (e)that a value of α as defined by the equation (2) below $$\alpha = \epsilon/t \quad (2)$$

(wherein α is $\epsilon/t$ when $\epsilon$ defined by $\epsilon = -ln$(sample diameter after t seconds $I_t$/initial sample diameter $I_o$) is 0.6) when uniaxially stretched under a constant tension such that initial stress (=tension/initial cross section of sample) measured at 170° C. is 3.0×10$^4$ Pa is not greater than 0.03 and time for sample breakage is not shorter than 25 seconds. If α exceeds 0.03, the deformation speed is higher whereas time for breakage less than 25 seconds results in a shortened hole opening time, so that there is the fear that fire resistance will be poor.

The ethylene (co)polymer of the present invention desirably has (f) HLMFR (High Load Melt Flow Rate) of 10.0 g/10 min or less. In particular, HLMFR for large blow molded products such as fuel tanks is preferably 5.0 (g/10 min) or less, and more preferably 4.0 (g/10 min) or less. Where HLMFR is above 10.0 (g/10 min), there is the fear that the drawdown resistance will remain unimproved.

The ethylene (co)polymer of the present invention is excellent in molding processability, rigidity and mechanical properties and is applied to extrusion molding, injection molding, blow molding, etc. Satisfaction of the above-mentioned requirements (a) to (e), and further the requirement (f) in the case of large or complicated-configured moldings such as tanks, overcomes the defects that the conventional polyethylene for blow molding has and provides the moldings with superiority in drawdown resistance, puncture resistance, parison control response, pinch-off properties or fire resistance.

The method for producing the ethylene (co)polymer of the present invention is not limited particularly so long as the requirements (a) to (d) above, desirably further the requirement (e), and more desirably further the requirement (f), are satisfied and it can be produced by a gas phase polymerization method, a slurry polymerization method, a solution polymerization method, etc., in the presence of a catalyst such as a Ziegler type catalyst, a Phillips type catalyst, a metallocene type catalyst or the like. Polymerization conditions are not limited particularly, but the polymerization temperature is usually 15 to 350° C., preferably 20 to 200° C., and more preferably 50 to 120 ° C. The polymerization pressure is usually from atmospheric to 70 KgG/cm$^2$, preferably atmospheric to 50 KgG/cm$^2$ in the case of low/medium pressure methods, whereas in the case of high pressure methods, it is desirable that the polymerization pressure is usually not higher than 1,500 KgG/cm$^2$. The polymerization method may be one step polymerization or multi-step polymerization having two-steps or more in which different polymerization conditions such as hydrogen concentration, monomer concentration, polymerization pressure, polymerization temperature, catalyst, etc. are used and is not limited particularly. It is also possible to blend a plurality of components having different properties to prepare the ethylene (co)polymer of the present invention.

In the present invention, known additives such as antistatic agents, antioxidants, lubricants, anti-blocking agents, anti-fogging agents, organic or inorganic pigments, fillers, ultraviolet absorbents, dispersants, weathering agents, crosslinking agents, foaming agents, flame retardants, etc. can if desired be added in such amounts that the object is not obstructed.

The hollow moldings of the present invention are hollow molding made of the above-mentioned ethylene (co)polymer or composition thereof and include detergent bottles, food containers such as beverage bottles and vegetable oil bottles, vessels such as kerosene cans, drums and medicine bottles, various fuel containers, various components such as spoilers, bumpers, etc., housings of home electric products, OA apparatus, etc., panel-like construction components for constituting simple toilets, pallets and the like.

The above-mentioned ethylene (co)polymer or composition thereof may be blended with in addition to the ethylene (co)polymer of the present invention other polyolefin resin in amounts of 1 to 70% by weight. The method of producing hollow moldings of the present invention includes an extrusion blow molding method, an injection blow molding method, an extrusion stretching blow molding method, an injection stretching blow molding method, etc., but not limited particularly to a cold parison method, a hot parison method, etc.

In another aspect, the present invention relates to a laminate, comprising at least a layer comprising the above-mentioned ethylene (co)polymer or composition thereof (hereafter, referred to as the present resin layer), and a barrier layer. The above-mentioned laminate is not limited particularly so long as there is a structure of the above-mentioned two types of layers and the order of their lamination is not limited particularly. Generally, it is preferred that the barrier layer is an intermediate layer and along with (an) adhesive layer(s) an inner layer and/or outer layer is constituted by the present resin layer, and the outer or inner layer is an other polyolefin layer.

The barrier layer used in the present invention is constituted by at least one resin selected from polyamide resins, ethylene/vinyl acetate copolymer saponification products, polyacrylonitrile resins, polymethacrylonitrile resins, polyacetal resins, polyester resins, polyvinylidene chloride resins, polycarbonate resins, or compositions thereof. From the viewpoint of performance and physical properties, polyamide resins, ethylene/vinyl acetate copolymer saponification products, poly(meth) acrylonitrile resins, polyester resins and polyvinylidene chloride resins are desirable.

The polyamide resins include polyamides obtained by polycondensation of a diamine with a dicarboxylic acid, polyamides obtained by condensation with an aminocarboxylic acid, polyamides obtained from a lactam, or copolymerized polyamides therefrom and those having a relative viscosity in the range of 1 to 6, a melting point of 170 to 280° C., preferably 200 to 240° C. are used. More specifically, there canbecitednylon-6, nylon-66, nylon-610, nylon-9, nylon-11, nylon-12, nylon-6/66, nylon-66/610, nylon-6/11 and mixtures or polymer alloys of these polyamide resins with polyolefin resins and the like. Of these, nylon-6 is preferred.

The above-mentioned ethylene/vinyl acetate copolymer saponification products include, for example, ethylene/vinyl acetate saponification products such as an ethylene/vinyl acetate copolymer having a degree of saponification of 90% or more, preferably 95% or more and an ethylene content of 15 to 50 mol %.

The poly(meth)acrylonitrile resins are (co)polymers which are polymers composed of a methacrylonitrile unit and/or acrylonitrile unit or copolymers composed of these units and an alkyl (meth)acrylate unit, with the ratio by weight being in the range of 95:5 to 70:30, and which have a weight average molecular weight measured by a GPC method in the range of 60,000 to 200,000.

The above-mentioned polyester resins include thermoplastic polyesters such as polyethylene terephthalate, polybutylene terephthalate, polyethylene terephthalate/isophthalate, polyethylene naphthalate, and benzoic acid polyester and mixtures or polymer alloys of these with polyolefins.

The above-mentioned polyvinylidene chloride resins are polymers having a vinylidene chloride unit content of, for example, 70 to 99 mol %, and preferably 80 to 98 mol % and examples of comonomer of the polyvinylidene chloride resin include acrylic monomers such as acrylonitrile, methacrylonitrile, methyl methacrylate, ethyl methacrylate, propyl methacrylate, glycidyl methacrylate, glycidyl acrylate, hydroxyethyl acrylate, and hydroxypropyl acrylate, and vinyl monomers such as vinyl chloride.

The adhesive layer used in the present invention is constituted by a resin which is at least one adhesive resin selected from copolymers of an unsaturated carboxylic acid or derivatives thereof and an olefin, modified polyolefins having an unsaturated carboxylic acid or derivatives thereof grafted thereto or resin composition which is a mixtures of that adhesive resin with unmodified polyolefin or the like.

Specific examples of the above-mentioned copolymers of unsaturated carboxylic acid or derivative thereof and an olefin include binary or more copolymers such as ethylene/(meth)acrylic acid copolymers, ethylene/glycidyl (meth)acrylate copolymers, ethylene/glycidyl (meth)acrylate/vinyl acetate terpolymers, ethylene/maleic anhydride copolymers, ethylene/(meth)acrylic acid/maleic anhydride terpolymers, styrene/maleic anhydride copolymers, and ethylene/styrene/maleic anhydride terpolymers.

The polyolefin modified with an unsaturated carboxylic acid or derivatives thereof of the present invention are polymers obtained by graft modifying polyolefin with an unsaturated carboxylic acid or derivatives thereof in the presence of a free radical generator such as an organic peroxide in an extruder or a kneader such as a Henschel mixer, or in a solvent such as a hydrocarbon.

Specific examples of the modified polyolefin include maleic anhydride-modified high density polyethylene, maleic anhydride-modified linear low density polyethylene, maleic anhydride-modified very-low density polyethylene, maleic anhydride-modified polypropylene and the like.

These are used singly or as modified polyolefin compositions by blending them with the above-mentioned unmodified polyolefin and optionally rubbers, etc., if desired.

The blending proportion of the adhesive resin and unmodified polyolefin is not limited particularly but generally the unmodified polyolefin may be blended in a blending proportion of 1 to 99% by weight. Further, it is desirable that the content of unsaturated carboxylic acid or derivatives thereof in the adhesive resin or composition thereof be selected in the range of $10^{-8}$ to $10^{-3}$ mole, and preferably $10^{-7}$ to $10^{-4}$ mole, per g of the resin component. With a content of below $10^{-8}$ mole, the adhesive strength is insufficient but a content exceeding 10–3 mole would cause "burn marks" or "gel" and be uneconomical.

The above-mentioned polyolefin resins include high/medium density polyethylenes, linear low density polyethylene, very-low density polyethylene, low density polyethylene by high pressure radical polymerization, ethylene/vinyl ester copolymers such as ethylene/vinyl acetate copolymers, polyethylene resins such as ethylene/unsaturated carboxylic acid alkyl ester copolymers such as ethylene/ethyl (meth) acrylate copolymers, propylene homopolymers, propylene/α-olefin random or block copolymers, α-olefin homopolymers such as 1-butene polymers, etc., mutual copolymers of these or the like. Of these, high/medium density polyethylenes, linear low density polyethylene, very-low density polyethylene, etc. are preferred.

The unsaturated carboxylic acid or derivatives thereof used in the present invention include acrylic acid, methacrylic acid, maleic acid, fumaric acid, itaconic acid, citraconic acid or their anhydrides, metal salts and the like. Of these, maleic anhydride is preferred.

The free radical generator used for graft modification includes organic peroxides, dicumyl compounds, etc. Because of reactivity and ease of handling, organic peroxide-base compounds are preferred. Specific examples thereof include dicumyl peroxide, 2,5-dimethyl-2,5-bis(t-butylperoxy)hexane, 2,5-dimethyl-2,5-bis(t-butylperoxy) hexyne-3,1,3-bis(2-t-butylperoxyisopropyl)benzene, benzoyl peroxide, etc. Examples of the dicumyl compounds include 2,3-dimethyl-2,3-diphenylbutane, 2,3-diethyl-2,3-diphenylbutane, 2,3-di(p-bromophenyl)butane, In particular, 2,3-di(p-bromophenyl)butane, etc. In particular, 2,3-diethyl-2,3-diphenylbutane is used preferably.

The hollow multilayer moldings of the present invention are obtained by extruding the respective resin layers described above through a multilayer die using a plurality of extruders and combine the layers before blow molding can be performed. For large vessels such as fuel tanks, drum cans and the like, drawdown resistance is more strictly required and fuel tanks are of complicated configuration since baffles are arranged therein so that local thinning tends to occur and hence puncture resistance, parison thickness controllability (parison control response), pinch-off shape properties, fire resistance and the like are required. In the present invention, use of the above-mentioned polymer or composition thereof of the present invention allows these requirements to be satisfied.

Further, in the present invention, it is desirable in view of economy to use, as an exterior layer of the hollow multilayer vessels, defective moldings of a laminate containing a layer of the above-mentioned (co)polymer of the present invention or composition thereof, an adhesive layer and a barrier layer, a recycled material such as burr, or a mixture of the recycled material, the (co)polymer of the present invention and general polyolefin resin. The blending amounts of the recycled material and polyolefin are not limited particularly.

The layer structure of the hollow multilayer vessels includes high density polyethylene (HDPE) layer of the invention/adhesive layer/polyamide resin (PA), HDPE layer of the invention/adhesive layer/ethylene-vinyl acetate copolymer saponification product (EVOH), HDPE layer of the invention/adhesive layer/polyester resin (PET), HDPE layer of the invention/adhesive layer/PA/adhesive layer/HDPE layer of the invention, HDPE layer of the invention/adhesive layer/ethylene-vinyl acetate copolymer saponification product (EVOH)/adhesive layer/HDPE layer of the invention, HDPE layer of the invention/adhesive layer/PET/adhesive layer/HDPE layer of the invention, HDPE layer of the invention +HDPE/adhesive layer/PA/adhesive layer/HDPE layer of the invention, recycled layer/adhesive layer/PA/adhesive layer/recycled layer, recycled layer/adhesive layer/PA/adhesive layer/HDPE of the invention, recycled layer/adhesive layer/PA/adhesive layer/HDPE layer, recycled layer+HDPE/adhesive layer/PA/adhesive layer/HDPE layer, HDPE layer/adhesive layer/EVOH layer/adhesive layer/recycled layer/HDPE+carbon black layer, etc.

The thickness of respective layers of the hollow moldings is not limited particularly. In the case of multilayer moldings, generally the thickness of barrier layer is selected in the range of 0.001 to 1.0 mm, and preferably 0.01 to 0.5mm, and the thickness of adhesive layer is selected in the range of 0.001 to 1.0 mm, and preferably 0.01 to 0.5 mm. Further, the thickness of the layer of the (co)polymer of the present invention or composition thereof and the thickness of other polyolefin layer are selected in the range of 0.5 to 10 mm, and preferably 1.0 to 7 mm.

Furthermore, another object of the present invention relates to a blow molding process in which thickness of a parison is adjusted by using the ethylene (co)polymer satisfying requirements (a) to (d) or composition thereof. Since the said ethylene (co)polymer particularly satisfies the requirement (c), it has an appropriate range of Die Swell (DS), and has little dependency on its shear rate($\dot{\gamma}$) (i.e., slope value (A) in equation(1) is small). That is, it has a property that the die swell (DS) changes little as the shear rate ($\dot{\gamma}$) changes. Commonly, the thickness of the product is controlled by adjusting the die gap while keeping the extrusion volume constant. When the extrusion volume is kept constant (in this case, it is convenient that conditions such as screw rotation speed of the extruder are the same), the shear rate ($\dot{\gamma}$) becomes small as the die gap becomes large, and the shear rate ($\dot{\gamma}$) becomes big as the die gap is narrow.

Therefore, if the die gap simply changes, the shear rate changes at the same time.

On the other hand, the thickness of a parison correlates to the die swell, and the thickness of a parison becomes thick as the die swell is large.

If the resin has a property that the value of the die swell (DS) changes much as the shear rate ($\dot{\gamma}$) changes, thickness dose not respond according to the change in the die gap. That is, the thickness does not change accordingly.

For example, in the case of the resin whose DS becomes small according to the decreasing shear rate ($\dot{\gamma}$) as a result that the die gap is made large, even if the die gap is made larger to increase the thickness of a parison, the DS becomes small and the thickness becomes thin, so that the thickness does not increase in spite of the increase in the die gap.

That is, (if the extrusion volume is kept constant) in the case of a conventional resin, the thickness of a parison does not increase sufficiently as a result of the property of the resin, even if the die gap is simply made larger to increase the thickness.

Therefore, the parison thickness controllability (parison control response) is bad.

Of course, the thickness of a parison can be increased if the die gap is made excessively large, but the present invention adjusts the thickness by slightly increasing the die gap and therefore, it is an excellent method since the width of the die gap adjusts the thickness.

In the case of a conventional ethylene (co)polymer, the parison thickness controllability (parison control response) is bad, and therefore, the resin improved in this property has been desired.

The ethylene (co)polymer of the present invention satisfying the above-mentioned requirement (c) can freely control the thickness of a parison in blow molding process proportional to the change in the die gap.

That is, even if the shear rate ($\dot{\gamma}$) changes by changing the die gap, the value of the die swell changes little, therefore, the thickness of a parison sufficiently changes with a slight change in the die gap.

Furthermore, the said ethylene (co)polymer of the present invention satisfying the above-mentioned requirement (d) can prevent local thinning of a parison.

In this way, according to the method of the above-mentioned invention, the thickness of a parison can be easily controlled by adjusting the die gap in a product having a complicated shape, the parison will not puncture when expansion shaped and the local thinning at corner portions of a product is ameliorated, and especially, the resin of the present invention can exhibit superiority in molding a large blow molded product having a complicated shape.

Another object of the present invention is a method of improving fire resistance in blow molded products by using the above-mentioned ethylene (co)polymer satisfying requirements (a) to (e) or composition thereof. The said ethylene (co)polymer especially satisfying the requirement (e) achieves excellent creep resistance under a constant tension, and it exhibits superiority in parison thickness controllability in high density as mentioned above, and blow molded products using the resin or resin composition of the invention (such as fuel tanks) hardly undergo creep deformation when heated, preventing local thinning, and can improve fire resistance because hole opening time is long at a fire resistance test.

BEST MODE FOR CARRYING OUT THE INVENTION

Hereafter, the present invention will be described in more detail by referring to examples and comparative examples. However, the present invention is not be limited to the following examples.

The physical properties of polyethylene and polyethylene resin compositions of Examples 1 to 3 and Comparative Examples 1 to 3, respectively, were measured by the following test method.

Test Method

| (1) Density: | According to JIS K6760. |
|---|---|
| (2) Flexural modulus: | According to ASTM D790. |
| (3) HLMFR: | According to JIS K6760. |

(4) Measurement of Molecular Weight Distribution

Measurement was performed using 150 Type GPC manufactured by Waters and two columns, Shodex HT-806M, and 1,2,4-trichlorobenzene (TBC) containing 0.05% by weight of 2,6-di-t-buty conditions of a sample amount of 0.8 mg/ml, a temperature of 140° C., and a flow rate of 1 ml/min.

(5) Measurement of Die Swell

"Capillograph 1C" manufactured by Toyo Seiki was used. A sample molten at 230° C. was extruded through an orifice having a diameter of 1 mm, a length of 40 mm and an inlet angle of 90° in a region of shear rate ($\dot{\gamma}$) of 6.08 to 24.32 sec$^{-1}$ and the diameter of the strand at the time when the length of strand reached 75 mm was measured using a laser diameter measuring apparatus attached (distance between the outlet of capillary and die swell detector: 10 mm). Die swell ratio (DS) was calculated as Ds/Do where Ds is the diameter of a strand and Do is the diameter of an orifice. The slope (A) and intercept (B) were obtained by the method of least squares by the equation of relationship between DS and ln ($\dot{\gamma}$):

$$DS = A \times ln(\dot{\gamma}) + B.$$

(6) Measurement of Stress Ratio

Preparation of Sample

"Capillograph 1C" manufactured by Toyo Seiki was used. A sample molten at 210° C. was extruded through an orifice having a diameter of 3 mm, a length of 15 mm and an inlet angle of 90° at a constant piston speed of 10 mm/min to obtain a sample.

Measurement of Stress Ratio

"Melten Rheometer" manufactured by Toyo Seiki was used. After annealing at 170° C. for 1,000 seconds, a sample was clamped by a clamp and stretch viscosity measurement was practiced at a strain speed of 0.1 sec$^{-1}$. The stress at a strain of 1.0 was defined "σ1.0" and the maximum stress value generated until the sample was broken was defined "γmax" and stress ratio "σmax/γ1.0" was calculated.

Measurement of α Value and Time for Breakage

A sample obtained in the same manner as in the case of measurement of stress ratio were measured using "Melten Rheometer" manufactured by Toyo Seiki. That is, a sample was molten at 170° C. and then clamped by a clamp and its stretch viscosity was measured under a constant tension such that initial stress (=tension/initial cross section of sample) was $3.0 \times 10^4$ Pa.

Assuming that when $l_o$ is an initial sample diameter and $l_t$ is a sample diameter after t seconds, then $\epsilon = -ln(l_t/l_o)$. The value of $\epsilon/t$ when $\epsilon = 0.6$ is assumed to be α, and the time until a sample was broken was measured as a time for breakage.

(7) Extrusion Properties:

Multilayer blow molding machine "NB30" manufactured by Nippon Seikosho (main material extruder: 90 mm) was used and the extruded amount was measured at 60 r.p.m.

(8) Drawdown Resistance:

Multilayer blow molding machine "NB30" manufactured by Nippon Seiko show as used. A 1,600cm-long parison weighing 8.5 kg was extruded at a resin temperature of 230° C. and after completion of the extrusion, changes in length of parison with lapse of time were measured. The parison after being shortened due to shrink back was sagging as a result of drawdown by self weight and elongated. The length of parison at the time when it was extruded is defined $L_o$ and the time counted from the that time until the parison once shortened by shrinking took the length of $L_o$ again was defined retention time, Tp, and evaluation of drawdown resistance was performed.

Drawdown resistance becomes better as retention time, Tp becomes longer.

(9) Pinch-off Shape Properties

Using the above-mentioned blow molding machine "NB30" and mold of 40-liter box-shaped molded products, 40-liter multilayer tanks (each weighing 6 kg) having a layer construction of resin layer of example or comparative example/adhesive layer (maleic anhydride-modified high density polyethylene) /nylon-6/adhesive layer/resin layer of example or comparative example were molded. The pinch-off portions of the obtained moldings were cut vertically with respect to pinch-off welded line. Pinch-off properties were evaluated from the thickness distribution in the cross sectional plane as shown in FIG. 1(a). The thickness of the welded portion at the pinch-off middle portion was defined "t" and the thickness of thicker portions on the both sides was defined "T", and pinch-off properties were evaluated by a ratio of t to T, t/T, (FIG. 1(b) and (c)).

When the pinched-off part recedes or sinks, its thickness t becomes small. If the pinched-off part does not recede, t/T=1. In the case of t/T<1, the pinched-off part sinks, and the property of pinch-off shape is bad.

(10) Puncture Resistance

Using a multilayer blow molding machine "NB30" manufactured by Nippon Seikosho (screw diameter: 90 mm, die diameter: 120 mm) and molds having the same inlet size of W1=200, W2=300) and different depths D (100, 150, 200, and 250 mm), box-shaped hollow moldings were molded and deep draw ratio (D/W1) at which puncture of parison occurred was evaluated to thereby evaluate molding limit (puncture resistance). Puncture resistance becomes good as the value of D/W1 becomes large, but in a method of this evaluation, D/W1=250/200=1.25 using a mold of D=250mm is the maximum (evaluation limit).

(11) Tank Drop Test

Using the above-mentioned multilayer tanks (9), drop tests were practiced. The drop tests were conducted by filling the tank with an aqueous 50% ethylene glycol solution to 70% of total volume and vertical drop tests were carried out at −40° C. at a height of 6 m.

(12) Parison Control Response

Using the above-mentioned blow molding machine and mold (9), elongated box-shaped hollow moldings were obtained by setting a parison controller such that the thickness of a part of the middle portion of the molding was thickened at the time of molding. The parison controller used was a 25-point setting parison controller manufactured by MOOG, attached to the above-mentioned molding machine. That is, this controller transmits an electric signal for instructing the die gap to increase or decrease 25 times per shot, and it has a structure that the die gap automatically temporarily changes responding to one time of the said signal. By measuring the thickness distribution of the resultant hollow moldings, the controllability of parison controller for setting of the thickness of a parison was measured. The thickness of the middle portion where the thickness was thickened was defined Tp and the thickness at standard point where no thickening occurred was defined Ts and a ratio Tp/Ts was calculated, which was used as an index of parison control response.

The thickness of a parison whose parison control response is bad cannot be thick according to the setting, and the difference between Tp and Ts is small, and therefore, Tp/Ts is small. In other words, parison control response becomes better as Tp/Ts becomes larger.

(13) Bottle Fire Resistance Tests

Using the above-mentioned blow molding machine, 300 ml bottles having a thickness of 2 mm and 3 mm were molded. Water was poured into the resultant bottle shaped moldings up to 50% of the inner volume and the moldings were sealed. Then the bottle was laid horizontally and heated by means of a propane gas burner, a nozzle of which was positioned at a distance from the lower side of the laid bottle. The time until a hole is opened in the molding due to the creeping of the molten material and subsequent decrease in thickness thereof was evaluated as fire resistant time.

The surface of the moldings is exposed to flame and may catch fire. However, since the part where a hole opens is usually near the surface of the water, such a hole opens not because of burning but because of the influence by heat-softening.

Apart from the case that bottles directly burn, if a hole opens in a bottle by heat-softening in the case of the fire to let the content flow out, it may cause spreading of fire depending on the contents. For example, if blow molded vessels are fuel tanks such as gasoline, flowing out of gasoline causes spreading the damage before tanks directly burn.

Therefore, the said bottle fire resistance tests are important for blow molded vessels which keep burnable liquid like fuel.

(14) Press Plate Melting Test

Press plates having a thickness of 2 mm and 3 mm were molded. The resultant press plates were burned from one side thereof with a flame of a mixed gas of methane and hydrogen and the time until the other side was molten was evaluated as melting time.

Example 1

Component 1 polymerized with a Phillips catalyst and Components 2 and 3 polymerized with $MgCl_2$ carried Ziegler catalyst were blended in a biaxial extruder (KTX-90 manufactured by Kobe Seikosho) to prepare a sample of Example 1. The detailed data and blend ratio for each component are shown in Table 1. The measured properties data are shown in Table 5.

TABLE 1

| Component | Blending proportion wt % | HL & MFR g/10 min | Density g/cm³ |
|---|---|---|---|
| Component 1 | 70 | HL = 1.9 | 0.956 |
| Component 2 | 15 | HL = 0.30 | 0.942 |
| Component 3 | 15 | MFR = 800 | 0.970 |
| Example 1 | — | HL = 2.3 | 0.955 |

Example 2

Component 1 polymerized with a Phillips catalyst and Components 2 and 3 polymerized with $MgCl_2$ carried Ziegler catalyst were blended in a biaxial extruder (KTX-90 manufactured by Kobe Seikosho) to prepare a sample of Example 1. The detailed data and blend ratio for each component are shown in Table 2. The measured properties data are shown in Table 5.

TABLE 2

| Component | Blending proportion wt % | HL & MFR g/10 min | Density g/cm³ |
|---|---|---|---|
| Component 1 | 70 | HL = 1.9 | 0.956 |
| Component 2 | 10 | HL = 0.30 | 0.942 |
| Component 3 | 20 | MFR = 800 | 0.970 |
| Example 2 | — | HL = 3.1 | 0.957 |

Example 3

Component 1 polymerized with a Phillips catalyst and Components 2 and 3 polymerized with $MgCl_2$ carried Ziegler catalyst were blended in a biaxial extruder (KTX-90 manufactured by Kobe Seikosho) to prepare a sample of Example 3. The detailed data and blend ratio for each component are shown in Table 3. The measured properties data are shown in 10 Table 5.

TABLE 3

| Component | Blending proportion wt % | HL & MFR g/10 min | Density g/cm³ |
|---|---|---|---|
| Component 1 | 65 | HL = 1.9 | 0.956 |
| Component 2 | 10 | HL = 0.30 | 0.942 |
| Component 3 | 25 | MFR = 810 | 0.972 |
| Example 3 | — | HL = 4.5 | 0.958 |

Comparative Example 1

Component 1 polymerized with a Phillips catalyst and Components 2 polymerized with $MgCl_2$ carried Ziegler catalyst were blended in a biaxial extruder (KTX-90 manufactured by Kobe Seikosho) to prepare a sample of Comparative Example 1. The detailed data and blend ratio for each component are shown in Table 4. The measured properties data are shown in Table 5.

TABLE 4

| Component | Blending proportion wt % | HL & MFR g/10 min | Density g/cm³ |
|---|---|---|---|
| Component 1 | 90 | HL = 1.9 | 0.956 |
| Component 2 | 10 | MFR = 800 | 0.970 |
| Comparative Example 2 | — | HL = 4.2 | 0.957 |

Comparative Example 2

Using a commercially available high density polyethylene for blow molding (density=0.947g/cm³, HLMFR =4.6, JLex HD 4551H, manufactured by Japan Polyolefins Co., Ltd.) extrusion properties and the like were evaluated. The results are shown in Table 5.

Comparative Example 3

Using a commercially available high density polyethylene for blow molding (density =0.951g/cm³, HLMFR =5.6, Hizex 8200B, manufactured by Mitsui Petrochemical Co., Ltd.) extrusion properties and the like were evaluated. The results are shown in Table 5.

The ethylene (co)polymer of Examples 1 to 3 satisfying requirements of the present invention is excellent in rigidity, extrusion properties, drawdown resistance, and fire resistance, and it is proved that blow molding by using the said (co)polymer exhibits superiority in puncture resistance of a parison, parison control response (parison thickness controllability), and pinch-off shape properties. Further, the molded products of the present invention are excellent in dropping impact strength and fire resistance.

On the other hand, comparative example 1 does not satisfy the requirement (c) (the value of slope (A) is large), and parison control response is inferior and it is difficult to control the thickness of a parison. Comparative example 2 does not satisfy the requirement (b), and drawdown resistance is poor, and comparative example 2 does not satisfy the requirement (e), and fire resistance is poor in both press plates and bottle moldings. Comparative example 3 does not satisfy the requirement (b), and drawdown resistance is poor, and comparative example 3 does not satisfy the requirement (c) (intercept (B) is small), and parison control response is inferior and it is difficult to control the thickness of a parison. Further, comparative example 3 does not satisfy the requirement (d), puncture resistance in a parison is poor, and comparative example 3 does not satisfy the requirement (e), fire resistance in moldings is poor. The pinch-off shapes of comparative example 3 are also bad and tanks are broken at a tank drop test.

What is claimed is:

1. A blow molding process in which the thickness of a parison is adjusted by changing the die gap while keeping the extrusion volume substantially constant by use of an ethylene (co)polymer which satisfies the following requirements (a) to (d):
    (a) a density of 0.93 to 0.98 g/cm$^3$,
    (b) a molecular weight distribution (Mw/Mn) of 25 to 50,
    (c) that values of slope (A) and of intercept (B) obtained from a die swell (DS) and a shear rate ($\dot{\gamma}$) measured in a region of shear rate ($\dot{\gamma}$) (6.08 to 24.8 sec$^{-1}$) at 230 °C., in accordance with the equation (1) below $$DS = A \times ln(\dot{\gamma}) \times B \qquad (1)$$

are such that $0 \leq A \leq 0.05$ and $1.25 \leq B \leq 1.45$,
    (d) that the stress ratio of a stress ($\sigma$) at a strain of 1.0 to a maximum stress ($\sigma max$) in a stress-strain curve in uniaxial stretching at 0.1 sec$^{-1}$ measured at 170° C. is such that $\sigma max/\sigma \leq 2.1$,
   or composition thereof.

2. The blow molding process of claim 1, wherein the ethylene (co)polymer further satisfies the requirement (e) that a value of $\alpha$ as defined by the equation (2) below $$\alpha = \epsilon/t \qquad (2)$$

TABLE 5

| ITEMS | | Example 1 | Example 2 | Example 3 | Comparative Example 1 | Comparative Example 2 | Comparative Example 3 |
|---|---|---|---|---|---|---|---|
| Density (g/cm3) | | 0.955 | 0.957 | 0.958 | 0.957 | 0.947 | 0.951 |
| Flexural modules (Kgf/cm2) | | 14500 | 15500 | 16000 | 15200 | 11000 | 13000 |
| HLMFR (g/10 min) | | 2.3 | 3.1 | 4.5 | 4.2 | 4.6 | 5.6 |
| Molecular weight distribution (Mw/Mn) | | 30 | 31 | 40 | 29 | 19 | 19 |
| Die swell | Slope (A) | 0.029 | 0.030 | 0.033 | 0.094 | 0.036 | 0.029 |
| properties | Intercept (B) | 1.32 | 1.30 | 1.29 | 1.40 | 1.29 | 1.21 |
| Stree ratio ($\sigma$ max/$\sigma$ 1.0) | | 2.99 | 3.01 | 2.98 | 2.97 | 3.5 | 1.78 |
| $\alpha$ Value | | 0.028 | 0.024 | 0.026 | 0.033 | 0.048 | 0.056 |
| Time for breakage (second) | | 32.9 | 31.5 | 30.2 | 26 | 16.1 | 12.6 |
| Extrusion properties (kg/hr) | | 105 | 107 | 120 | 90 | 101 | 96 |
| Drawdown properties (Tp: second) | | >60 | >60 | 45 | 35 | 30 | 18 |
| Pinch-off shape properties (t/T) | | 1.0 | 1.0 | 1.0 | 1.0 | 1.0 | 0.67 |
| Puncture resistance (Blow ratio: D/W1) | | >1.25 | >1.25 | >1.25 | >1.25 | >1.25 | 1.0 |
| Tank drop test (−40° C., 6 m) | | ◯ | ◯ | ◯ | ◯ | ◯ | Pinch cracks |
| Parison control response (Tp/Ts) | | 1.50 | 1.51 | 1.48 | 1.32 | 1.46 | 1.33 |
| Bottle fire resistance test | 2 mm | 120 | 117 | 118 | 109 | 96 | 95 |
| (hole opening time: second) | 3 mm | 208 | 204 | 206 | 190 | 167 | 164 |
| Press plate melting test | 2 mm | 30 | 32 | 36 | 31 | 21 | 24 |
| (melting time: second) | 3 mm | 52 | 55 | 60 | 54 | 40 | 44 |

INDUSTRIAL APPLICABILITY

As described above, by use of the (co)polymer of the present invention there can be obtained hollow moldings which are excellent in drawdown resistance, puncture resistance, parison control response, pinch-off shape and fire resistance, according to the blow molding process in which the thickness of parison is adjusted by using the said (co)polymer, causes no local thinning and is excellent in mechanical strength such as impact strength and rigidity, and fire resistance. It can be used advantageously as a material for blow molding of large hollow moldings such as fuel tanks and drum cans having complicated shapes such as baffles.

(wherein $\alpha$ is $\epsilon/t$ when $\epsilon$ defined by $\epsilon = -ln$(sample diameter after t seconds $I_t$/initial sample diameter $I_0$) is 0.6) when uniaxially stretched under a constant tension such that initial stress (=tension\initial cross section of sample) measured at 170° C. is 3.0×10$^4$Pa is not greater than 0.03 and time for sample breakage is not shorter than 25 seconds.

3. The blow molding process of claim 1, wherein the ethylene (co)polymer further satisfies the requirement (f) HLMFR $\leq$ 10 g/10 min.

4. The ethylene (co)polymer as claimed in claim 1, wherein the ethylene (co)polymer has a $C_{3-20}$ $\alpha$-olefin content of 10 mol % or less.

* * * * *